(12) United States Patent
Li et al.

(10) Patent No.: US 11,934,866 B2
(45) Date of Patent: Mar. 19, 2024

(54) OPERATOR OPERATION SCHEDULING METHOD AND APPARATUS TO DETERMINE AN OPTIMAL SCHEDULING POLICY FOR AN OPERATOR OPERATION (71) Applicant: Huawei Technologies Co., Ltd., Shenzhen (CN)

(72) Inventors: Lin Li, Hangzhou (CN); Hao Ding, Shenzhen (CN); Kang Yang, Hangzhou (CN); Dengcheng Zhang, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 609 days.

(21) Appl. No.: 17/144,780

(22) Filed: Jan. 8, 2021

(65) Prior Publication Data
US 2021/0132990 A1 May 6, 2021

Related U.S. Application Data (63) Continuation of application No. PCT/CN2020/083635, filed on Apr. 8, 2020.

(30) Foreign Application Priority Data

Apr. 9, 2019 (CN) .......................... 201910282106.8

(51) Int. Cl.
G06F 9/48 (2006.01)
G06F 9/50 (2006.01)
(Continued)

(52) U.S. Cl.
CPC .......... *G06F 9/4881* (2013.01); *G06F 9/5027* (2013.01); *G06F 12/0811* (2013.01); *G06F 12/0897* (2013.01); *G06N 20/00* (2019.01)

(58) Field of Classification Search
None
See application file for complete search history.

(56) References Cited

U.S. PATENT DOCUMENTS 6,131,093 A * 10/2000 Maruyama ....... G06Q 10/06314
2009/0007101 A1* 1/2009 Azar ..................... G06F 9/5077
718/1
(Continued)

FOREIGN PATENT DOCUMENTS

| CN | 104683488 A | 6/2015 |
| CN | 106708838 A | 5/2017 |

(Continued)

OTHER PUBLICATIONS

Mohammed Rahman et al., "Neural Network Assisted Tile Size Selection", Dept. of Computer Science and EngineeringOhio State University, Jun. 22, 2010, iWAPT 2010 Workshop, Berkeley, USA, total 18 pages.

*Primary Examiner* — Abu Zar Ghaffari
(74) *Attorney, Agent, or Firm* — Conley Rose, P.C.

(57) ABSTRACT

A method includes obtaining an operator parameter and a processor parameter corresponding to an operator operation, creating N scheduling policies based on the operator parameter and the processor parameter, where the N scheduling policies are classified into M scheduling policy subsets, and each scheduling policy subset includes at least one scheduling policy, filtering the M scheduling policy subsets based on the operator parameter and the processor parameter, to obtain K feasible scheduling policies, where the K feasible scheduling policies are optimal scheduling policies of K feasible scheduling subsets in the M scheduling policy subsets, inputting the operator parameter and the K feasible scheduling policies into a cost model to obtain K operator operation costs, wherein N, M, and K are natural numbers, (Continued)

and determining, based on a target requirement and the K operator operation costs, an optimal scheduling policy used for the operator operation.

20 Claims, 7 Drawing Sheets

(51) Int. Cl.
   *G06F 12/0811* (2016.01)
   *G06F 12/0897* (2016.01)
   *G06N 20/00* (2019.01)

(56) References Cited

U.S. PATENT DOCUMENTS

| | | | | |
|---|---|---|---|---|
| 2014/0317088 A1* | 10/2014 | Al-Omari | ......... | G06F 16/24542 |
| | | | | 707/718 |
| 2014/0351819 A1* | 11/2014 | Shah | ..................... | G06F 9/4881 |
| | | | | 718/103 |
| 2017/0083873 A1* | 3/2017 | Syrichas | ............ | G06Q 10/1095 |
| 2018/0260245 A1* | 9/2018 | Smith | ..................... | G06F 9/542 |
| 2020/0225983 A1* | 7/2020 | Jung | ..................... | G06F 9/5027 |
| 2021/0278825 A1* | 9/2021 | Wen | ................. | G05B 19/41865 |

FOREIGN PATENT DOCUMENTS

| | | | | | |
|---|---|---|---|---|---|
| CN | | 107273193 A | | 10/2017 | |
| CN | | 108491274 A | | 9/2018 | |
| CN | | 109189572 A | | 1/2019 | |
| EP | | 1630671 A1 * | | 3/2006 | ........... G06F 9/4881 |
| WO | | 2013080152 A1 | | 6/2013 | |

\* cited by examiner

|  | General scheduling space i | General scheduling space j |
|---|---|---|
| Segmentation type |  |  |
| Cyclic sequence | First A and then B | First B and then A |
| Data stream | Undergo three levels of caching | Undergo two levels of caching |

FIG. 3

|  | Feasible scheduling policy i | Feasible scheduling policy j |
|---|---|---|
| Segmentation type |  |  |
| Cyclic sequence | First A and then B | First B and then A |
| Data stream | Undergo three levels of caching | Undergo two levels of caching |
| Feasible | Infeasible | Feasible |
| Parameters of the scheduling policy | — — | A_H, A_W, B_H, B_W |

OPERATOR OPERATION SCHEDULING METHOD AND APPARATUS TO DETERMINE AN OPTIMAL SCHEDULING POLICY FOR AN OPERATOR OPERATION

CROSS-REFERENCE TO RELATED APPLICATIONS

This application is a continuation of International Patent Application No. PCT/CN2020/083635, filed on Apr. 8, 2020, which claims priority to Chinese Patent Application No. 201910282106.8, filed on Apr. 9, 2019. The disclosures of the aforementioned applications are hereby incorporated by reference in their entireties.

TECHNICAL FIELD

This application relates to artificial intelligence (AI) technologies, and in particular, to an operator operation scheduling method and apparatus.

BACKGROUND

With rapid development of AI, a deep learning technology is applied in a growing quantity of practical applications, for example, speech recognition, machine translation, and self-driving. The deep learning technology has great potential in real-life applications, and therefore attracts increasing attention. Computing efficiency of a deep neural network (DNN) used in the deep learning technology directly affects an effect of an actual application. For example, a computing time of algorithms such as target detection, target recognition, and motion prediction in self-driving determines availability and security of the algorithms. Therefore, how to perform AI computing with high performance is an urgent requirement for implementation of industrial products.

AI computing usually uses two types of chips general-purpose computing chips and dedicated chips. The general-purpose computing chip includes a central processing unit (CPU) and a graphics processing unit (GPU). Many companies have started to vigorously deploy dedicated AI chips. Therefore, in the case of a plurality of chip architectures, how to use a general algorithm to improve computing efficiency of a heterogeneous chip is faced with great difficulties and challenges.

Currently, there are some solutions in the industry. One solution is to use an artificial neural network (ANN) to fit impact of loop nested segmentation on performance, and is used to instruct an operator operation scheduling method of loop nested segmentation. In this solution, a size of the loop nested segmentation is used as a parameter. By sampling on space including all possible sizes of loop nested segmentation, ANN models for sizes and performance of the loop nested segmentation are established. Then, the ANN model is used to replace a real machine to traverse the space including all possible sizes of loop nested segmentation, to select a candidate size of loop nested segmentation. Finally, an optimal size of loop nested segmentation is selected through running of an actual machine.

However, the foregoing solution is only for one operator operation and is not universal. In addition, all possible operator operation space needs to be traversed by using the ANN, which is quite time-consuming. Further, a scheduling policy needs to be run by the actual machine for a plurality of times, and millisecond-level real-time output of the scheduling policy cannot be met.

SUMMARY

This application provides an operator operation scheduling method and apparatus, to implement general processing on a processor architecture and an operator type, and improve operator operation performance.

According to a first aspect, this application provides an operator operation scheduling method, including obtaining an operator parameter and a processor parameter that correspond to an operator operation, creating N scheduling policies based on the operator parameter and the processor parameter, where the N scheduling policies are classified into M scheduling policy subsets, each scheduling policy subset includes at least one scheduling policy, and both N and M are natural numbers, filtering the M scheduling policy subsets based on the operator parameter and the processor parameter, to obtain K feasible scheduling policies, where the K feasible scheduling policies are optimal scheduling policies of K feasible scheduling subsets in the M scheduling policy subsets, and K is a natural number less than or equal to M, inputting the operator parameter and the K feasible scheduling policies into a cost model to obtain K operator operation costs, where the K operator operation costs are in a one-to-one correspondence with the K feasible scheduling policies, and determining, based on a target requirement and the K operator operation costs, an optimal scheduling policy used for the operator operation.

In this application, factors, in the processor parameter and the operator parameter, that are difficult to be directly modeled are used to create a plurality of scheduling policies, and these scheduling policies are classified into a plurality of scheduling policy subsets. Then, filtering is performed on each scheduling policy subset to obtain an optimal scheduling policy in each scheduling policy subset. This reduces a quantity of to-be-searched scheduling policy subsets. Finally, an optimal scheduling policy used for the operator operation is obtained by using the cost model. This enables the operator operation scheduling method to support output of a scheduling policy of any operator parameter and any processor parameter, implements general processing on a processor architecture and an operator type, and improves operator operation performance.

In a possible implementation, the filtering the M scheduling policy subsets based on the operator parameter and the processor parameter, to obtain K feasible scheduling policies includes determining a constraint condition based on the operator parameter and the processor parameter, and filtering the M scheduling policy subsets based on the constraint condition, to obtain the K feasible scheduling subsets, and inputting scheduling policies in the K feasible scheduling subsets into a target function to obtain the K feasible scheduling policies, where the K feasible scheduling policies are optimal scheduling policies in the K feasible scheduling subsets.

In a possible implementation, the determining, based on a target requirement and the K operator operation costs, an optimal scheduling policy used for the operator operation includes selecting, as the optimal scheduling policy based on the K operator operation costs, a feasible scheduling policy that meets the target requirement.

In a possible implementation, the operator parameter includes at least one of the following information an operator type or an operator shape size, the processor parameter includes at least one of the following information a processor architecture, a cache hierarchy, a cache capacity and bandwidth, a computing capability, or a processing dominant frequency, and the scheduling policy includes at least one of the following information a segmentation type, a cyclic sequence, or a data stream.

In a possible implementation, before the obtaining an operator parameter and a processor parameter that correspond to an operator operation, the method further includes obtaining a sample operator parameter and a sample processor parameter, where the sample operator parameter is an available operator parameter, and the sample processor parameter is an available processor parameter, creating X scheduling policies based on the sample operator parameter and the sample processor parameter, where the X scheduling policies are classified into Y scheduling policy subsets, each scheduling policy subset includes at least one scheduling policy, and both X and Y are natural numbers, filtering the Y scheduling policy subsets based on the sample operator parameter and the sample processor parameter, to obtain Z feasible scheduling policies, where the Z feasible scheduling policies are optimal scheduling policies of Z feasible scheduling subsets in the Y scheduling policy subsets, and Z is a natural number less than or equal to Y, and performing training based on the sample operator parameter and the Z feasible scheduling policies, to obtain the cost model.

In this application, in a case of an offline state, a maximal quantity of factors, in the processor parameter and the operator parameter, that are difficult to be directly modeled are used to create a plurality of scheduling policies, and these scheduling policies are classified into a plurality of scheduling policy subsets. Then, filtering is performed on each scheduling policy subset to obtain an optimal scheduling policy in each scheduling policy subset. This reduces a quantity of to-be-searched scheduling policy subsets. Finally, training is performing by using a running cost of the actual processor as a target, to obtain the cost model. This improves accuracy of cost obtaining, and improves efficiency of online processing.

In a possible implementation, the performing training based on the sample operator parameter and the Z feasible scheduling policies, to obtain the cost model includes inputting the sample operator parameter and the Z feasible scheduling policies into a corresponding processor to obtain Z operator operation costs, where the Z operator operation costs are in a one-to-one correspondence with the Z feasible scheduling policies, and performing training based on the sample operator parameter and the Z feasible scheduling policies by using the Z operator operation costs as a target, to obtain the cost model.

According to a second aspect, this application provides an operator operation scheduling apparatus, including a general scheduling module, configured to obtain an operator parameter and a processor parameter that correspond to an operator operation, and create N scheduling policies based on the operator parameter and the processor parameter, where the N scheduling policies are classified into M scheduling policy subsets, each scheduling policy subset includes at least one scheduling policy, and both N and M are natural numbers, a global feature module, configured to filter the M scheduling policy subsets based on the operator parameter and the processor parameter, to obtain K feasible scheduling policies, where the K feasible scheduling policies are optimal scheduling policies of K feasible scheduling subsets in the M scheduling policy subsets, and K is a natural number less than or equal to M, a cost model, configured to input the operator parameters and the K feasible scheduling policies into the cost model to obtain K operator operation costs, where the K operator operation costs are in a one-to-one correspondence with the K feasible scheduling policies, and an optimal scheduling selection module, configured to determine, based on a target requirement and the K operator operation costs, an optimal scheduling policy used for the operator operation.

In a possible implementation, the global feature module is configured to determine a constraint condition based on the operator parameter and the processor parameter, and filter the M scheduling policy subsets based on the constraint condition, to obtain the K feasible scheduling subsets, and input scheduling policies in the K feasible scheduling subsets into a target function to obtain the K feasible scheduling policies, where the K feasible scheduling policies are optimal scheduling policies in the K feasible scheduling subsets.

In a possible implementation, the optimal scheduling selection module is configured to select, as the optimal scheduling policy based on the K operator operation costs, a feasible scheduling policy that meets the target requirement.

In a possible implementation, the operator parameter includes at least one of the following information an operator type or an operator shape size, the processor parameter includes at least one of the following information a processor architecture, a cache hierarchy, a cache capacity and bandwidth, a computing capability, or a processing dominant frequency, and the scheduling policy includes at least one of the following information a segmentation type, a cyclic sequence, or a data stream.

In a possible implementation, the apparatus further includes a training module. The general scheduling module is further configured to obtain a sample operator parameter and a sample processor parameter, where the sample operator parameter is an available operator parameter, and the sample processor parameter is an available processor parameter, create X scheduling policies based on the sample operator parameter and the sample processor parameter, where the X scheduling policies are classified into Y scheduling policy subsets, each scheduling policy subset includes at least one scheduling policy, and both X and Y are natural numbers. The global feature module is further configured to filter the Y scheduling policy subsets based on the sample operator parameter and the sample processor parameter, to obtain Z feasible scheduling policies, where the Z feasible scheduling policies are optimal scheduling policies of Z feasible scheduling subsets in the Y scheduling policy subsets, and Z is a natural number less than or equal to Y. The training model is configured to perform training based on the sample operator parameter and the Z feasible scheduling policies, to obtain the cost model.

In a possible implementation, the training model is configured to input the sample operator parameter and the Z feasible scheduling policies into a corresponding processor to obtain Z operator operation costs, where the Z operator operation costs are in a one-to-one correspondence with the Z feasible scheduling policies, and perform training based on the sample operator parameter and the Z feasible scheduling policies by using the Z operator operation costs as a target, to obtain the cost model.

According to a third aspect, this application provides a computer device, including one or more processors, and a memory, configured to store one or more programs, and when the one or more programs are executed by the one or more processors, the one or more processors are enabled to implement the method according to any one of the first aspect or the possible implementations of the first aspect.

According to a fourth aspect, this application provides a computer-readable storage medium. The computer-readable storage medium stores an instruction, and when the instruction is run on a computer, the instruction is used to perform the method according to any one of the possible implementations of the first aspect.

According to a fifth aspect, this application provides a computer program. When executed by a computer, the computer program is used to perform the method according to any one of the possible implementations of the first aspect.

DESCRIPTION OF EMBODIMENTS

To make the objectives, technical solutions, and advantages of this application clearer, the following clearly and describes the technical solutions in this application with reference to the accompanying drawings in this application. Clearly, the described embodiments are merely a part rather than all of the embodiments of this application. All other embodiments obtained by persons of ordinary skill in the art based on the embodiments of this application without creative efforts shall fall within the protection scope of this application.

Figure 1:
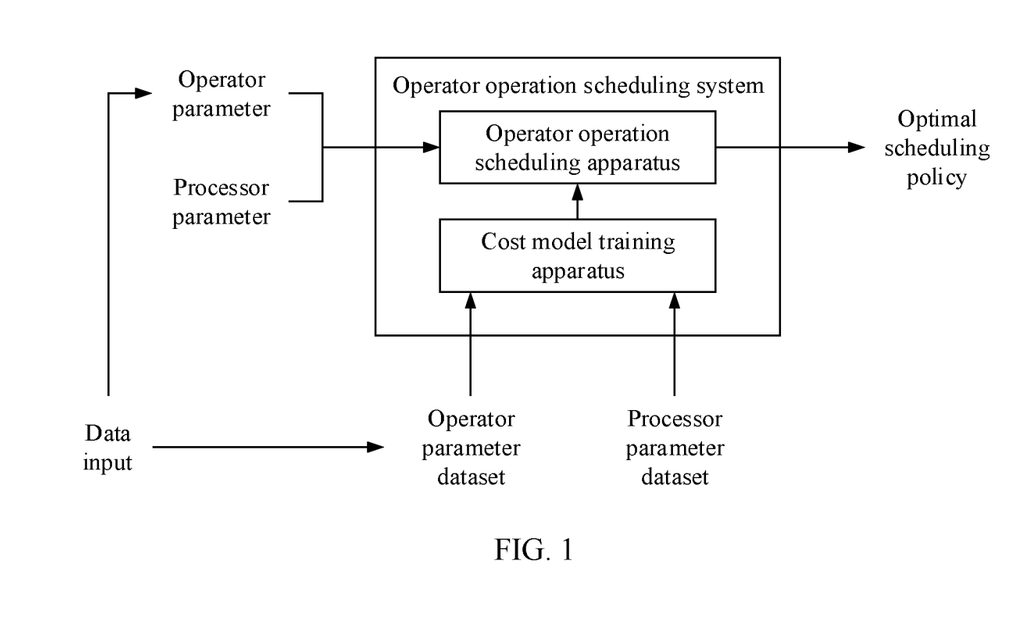
FIG. 1 is a schematic diagram of an application scenario of an operator operation scheduling method according to an embodiment of this application.

FIG. 1 is a schematic diagram of an application scenario of an operator operation scheduling method according to an embodiment of this application. As shown in FIG. 1, the method in this embodiment is executed by an operator operation scheduling system. The operator operation scheduling system includes an operator operation scheduling apparatus and a cost model training apparatus. The cost model training apparatus performs training based on an implementable operator parameter dataset and an adoptable processor parameter dataset, to obtain a cost model of each scheduling policy. This process is an offline processing process. In an embodiment, in a case of non-operator operation scheduling, the cost model training apparatus collects a maximal quantity of operator parameters and processor parameters, and a processor performs actually executes on these parameters to obtain an actual cost of the scheduling policy. Then, the cost model training apparatus performs training, by using a correspondence between the operator parameter and the processor parameter with the actual cost as a target, to obtain the cost model. The operator operation scheduling apparatus inputs an operator parameter and a processor parameter that correspond to an operator operation into the cost model, to obtain an optimal scheduling policy for the operator operation. This process is an online processing process. In an embodiment, for an operator parameter and a processor parameter in each actual operator operation scheduling, the cost model obtained through training may be used to determine an optimal scheduling policy corresponding to the operator parameter and the processor parameter. The operator operation scheduling method in this application is implemented in a form of program code that is included in software of the operator operation scheduling system and that is deployed on processor hardware.

It should be noted that the operator operation is an abstract description of a process in which an operation needs to be performed, and includes steps of an operation method, operation data of the steps, and the like. A scheduling policy refers to specific steps in an embodiment of an operator operation, including a direction of a data stream, a data segmentation size, an operation sequence, and the like. A scheduling policy subset is space including scheduling policies. Each point in the space represents a scheduling policy.

Figure 2:
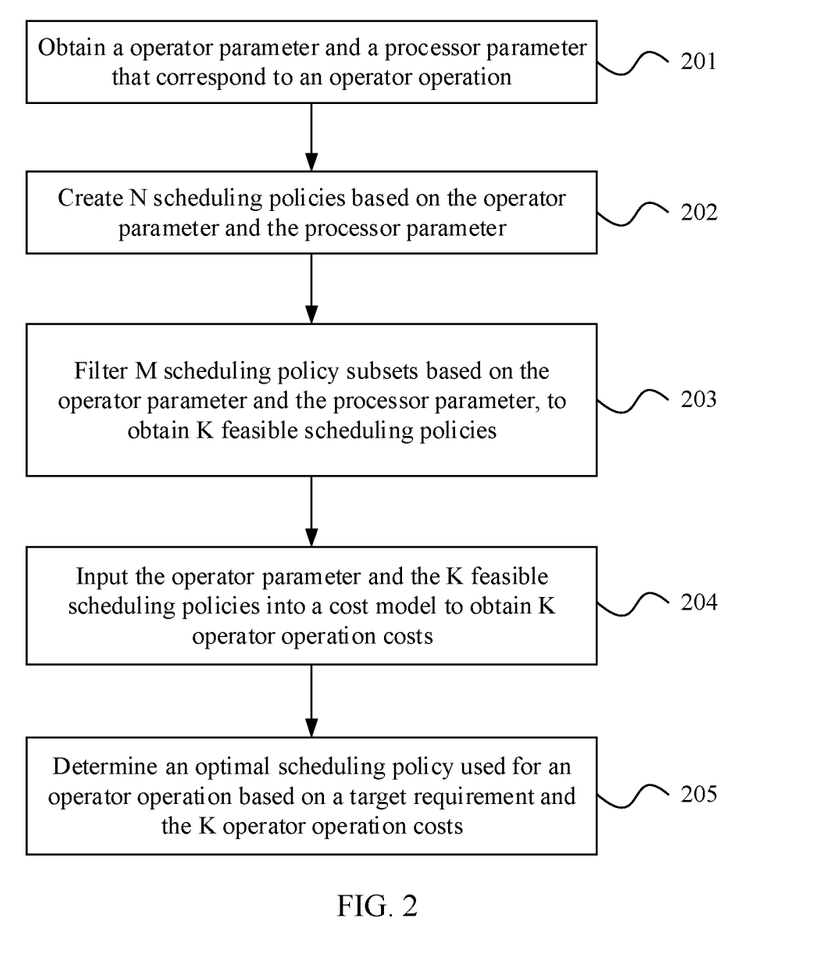
FIG. 2 is a flowchart of Embodiment 1 of an operator operation scheduling method according to this application.

FIG. 2 is a flowchart of Embodiment 1 of an operator operation scheduling method according to this application. The method in this embodiment shown in FIG. 2 is executed by an operator operation scheduling system, and the method may include the following steps.

Step 201. Obtain an operator parameter and a processor parameter that correspond to an operator operation.

To determine an optimal scheduling policy used for an operator operation, the operator operation scheduling system first needs to obtain a related operator parameter and processor parameter. The operator parameter includes at least one of the following information an operator type, an operator shape size, or the like. The processor parameter includes at least one of the following information a processor architecture, a cache hierarchy, a cache capacity and bandwidth, a computing capability, or a processing dominant frequency. These parameters may be obtained from data input by an input end, or may be obtained from the operator operation scheduling system based on a model or a type of a processor.

Step 202. Create N scheduling policies based on the operator parameter and the processor parameter.

Figure 3:
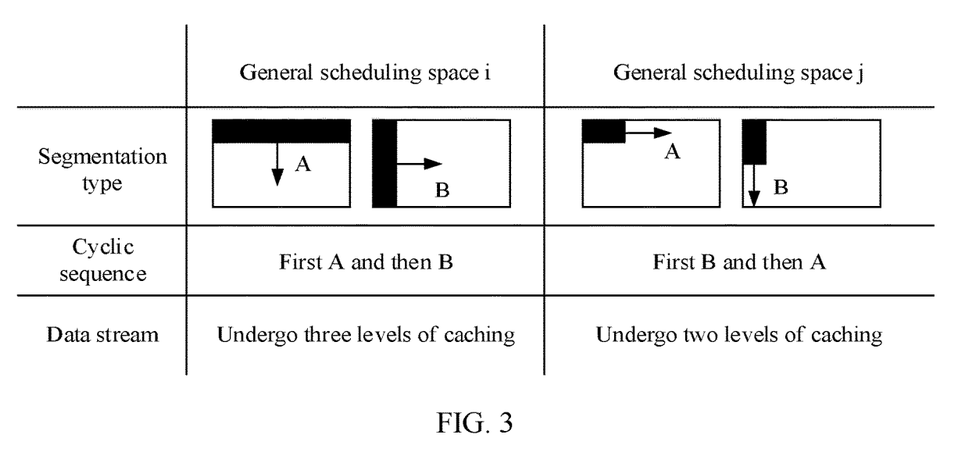
FIG. 3 is a schematic diagram of a general scheduling policy subset according to an embodiment of this application.

The N scheduling policies are classified into M scheduling policy subsets, each scheduling policy subset includes at least one scheduling policy, and both N and M are natural numbers. In this application, the operator operation scheduling system use factors, for example, the operator type, a data format, and the processor architecture, in the processor parameter and the operator parameter, that are difficult to be directly modeled, to create the N scheduling policies. Then, the N scheduling policies are classified into the M scheduling policy subsets, and a general filter condition for the related operator parameter and processor parameter is set for each scheduling policy subset. In this way, isolation between a hardware parameter and a software parameter is implemented. This supports output of a scheduling policy of any operator parameter and any processor parameter, and ensures that the scheduling method is applicable to any operator parameter and any processor. In the operator computing scheduling system, the processor architecture and the operator type are not directly modeled. Instead, the M scheduling policy subsets are constructed. This avoids impact of modeling precision on a scheduling policy, saves time in modeling, avoids non-transferability of modeling, and therefore implements universality to the processor architecture and the operator type. For example, FIG. 3 is a schematic diagram of a scheduling policy subset according to an embodiment of this application. As shown in FIG. 3, a scheduling policy subset i and a scheduling policy subset j differ in the following factors a segmentation type, a cyclic sequence, and a data stream. In an embodiment, a matrix A and a matrix B in the scheduling policy subset i are segmented by row and by column respectively. During computation, the matrix A is first cyclically segmented, and then the matrix B is cyclically segmented. An entire segmentation process undergoes three levels of caching. In the scheduling policy subset j, the matrix A and the matrix B each are segmented by row and by column. During computation, the matrix B is cyclically segmented first by column and then by row, and then the matrix A is cyclically segmented first by row and then by column. An entire segmentation process undergoes two levels of caching.

Step 203. Filter the M scheduling policy subsets based on the operator parameter and the processor parameter, to obtain K feasible scheduling policies.

Figure 4:
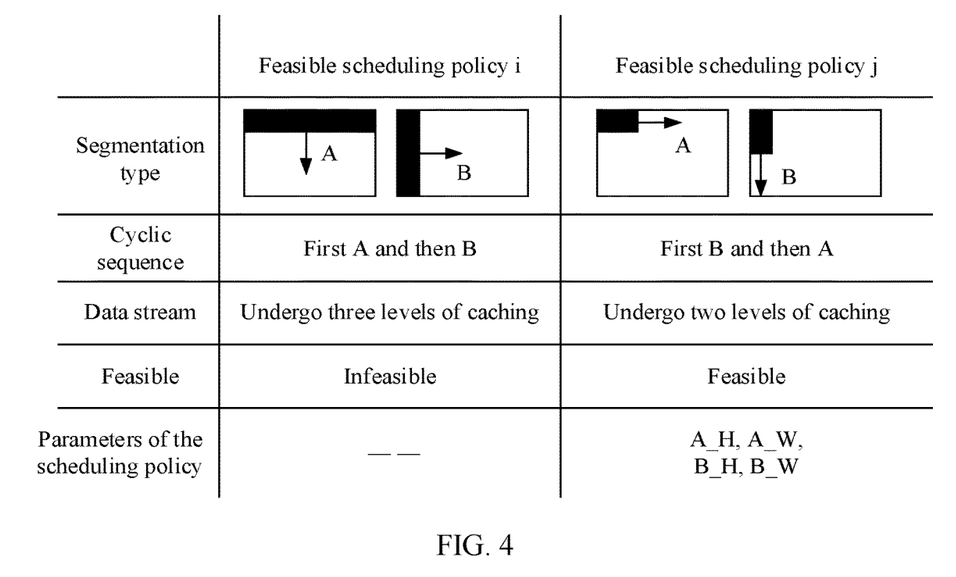
FIG. 4 is a schematic diagram of a feasible scheduling policy according to an embodiment of this application.

The K feasible scheduling policies are optimal scheduling policies of K feasible scheduling subsets in the M scheduling policy subsets, and K is a natural number less than or equal to M. The operator operation scheduling system determines a constraint condition based on the operator parameter and the processor parameter, and filters the M scheduling policy subsets based on the constraint condition, to obtain the K feasible scheduling subsets. One or more subsets may be filtered out from the M scheduling policy subsets based on the constraint condition, or all the M scheduling policy subsets are reserved. Therefore, K is a natural number less than or equal to M. Then, scheduling policies in the K feasible scheduling subsets are input into a target function to obtain the K feasible scheduling policies, where the K feasible scheduling policies are optimal scheduling policies in the K feasible scheduling subsets. In this application, the operator operation scheduling system first filters the M scheduling policy subsets based on the constraint condition, to filter out an infeasible scheduling policy subset and/or scheduling policy, so as to reduce a quantity of to-be-searched scheduling policies. Then, the scheduling policies in the K feasible scheduling subsets are input into the target function for further filtering, so that output scheduling policies are optimal scheduling policies in the feasible scheduling policy subset. Then, a data reuse rate of a scheduling policy is used as an indicator to instruct dimensionality reduction processing performed on the feasible scheduling policy subset. A higher data reuse rate indicates less repeated data migration, better performance, and lower power consumption. For example, FIG. 4 is a schematic diagram of a feasible scheduling policy subset according to an embodiment of this application. As shown in FIG. 4, the scheduling policy subset is filtered based on the operator parameter and the processor parameter, to obtain the feasible scheduling policy subset. Features of the operator parameter, the processor parameter, and the scheduling policy are extracted, and then dimensionality reduction processing is performed on the feasible scheduling policy subset by using a data reuse rate as a target, to obtain an optimal scheduling policy in the feasible scheduling policy subset. The feasible scheduling policy subset includes two scheduling policies (i and j). Only one-dimensional (row or column) segmentation is performed on matrices (A and B) in the scheduling policy i. A matrix obtained after the segmentation exceeds a cache size. Therefore, the scheduling policy i is an infeasible scheduling policy. Two-dimensional (row and column) segmentation is performed on each of matrices (A and B) in the scheduling policy j. A matrix obtained after the segmentation meets a cache size requirement. Therefore, the scheduling policy j is an optimal scheduling policy in the feasible scheduling policy subset. Parameters of the scheduling policy include a height and a width (A_H and A_W) of the matrix A and a height and a width (B_H and B_W) of the matrix B.

Step 204. Input the operator parameters and the K feasible scheduling policies into a cost model to obtain K operator operation costs.

The K operator operation costs are in a one-to-one correspondence with the K feasible scheduling policies. The operator operation scheduling system inputs the K feasible scheduling policies to the cost model to obtain corresponding operator operation costs. The operator operation costs include but are not limited to time consumption, total running power consumption, and the like of an operator operation. The cost model is a model for predicting a running cost of a scheduling policy. As described above, the cost model is obtained through training in the operator operation scheduling system in an offline processing process.

Step 205. Determine, based on a target requirement and the K operator operation costs, an optimal scheduling policy used for the operator operation.

The operator operation scheduling system selects, as the optimal scheduling policy based on the K operator operation costs, a feasible scheduling policy that meets the target requirement. The target requirement includes a customer's optimal criterion of, for example, an implementation criterion of performance, power consumption, or the like. On a premise of a minimal operator operation cost, in the operator computing scheduling system, one of the K feasible scheduling policies may be selected as the optimal scheduling policy based on the target requirement, for the operator operation. The target requirement includes lowest power consumption, performance that meets the customer's criterion, and the like.

In this application, factors, in the processor parameter and the operator parameter, that are difficult to be directly modeled are used to create a plurality of scheduling policies, and these scheduling policies are classified into a plurality of scheduling policy subsets. Then, filtering is performed on each scheduling policy subset to obtain an optimal scheduling policy in each scheduling policy subset, reducing a quantity of to-be-searched scheduling policy subsets. Finally, an optimal scheduling policy used for the operator operation is obtained by using the cost model. This enables the operator operation scheduling method to support output of a scheduling policy of any operator parameter and any processor parameter, implements general processing on the processor architecture and the operator type, and improves operator operation performance.

Figure 5:
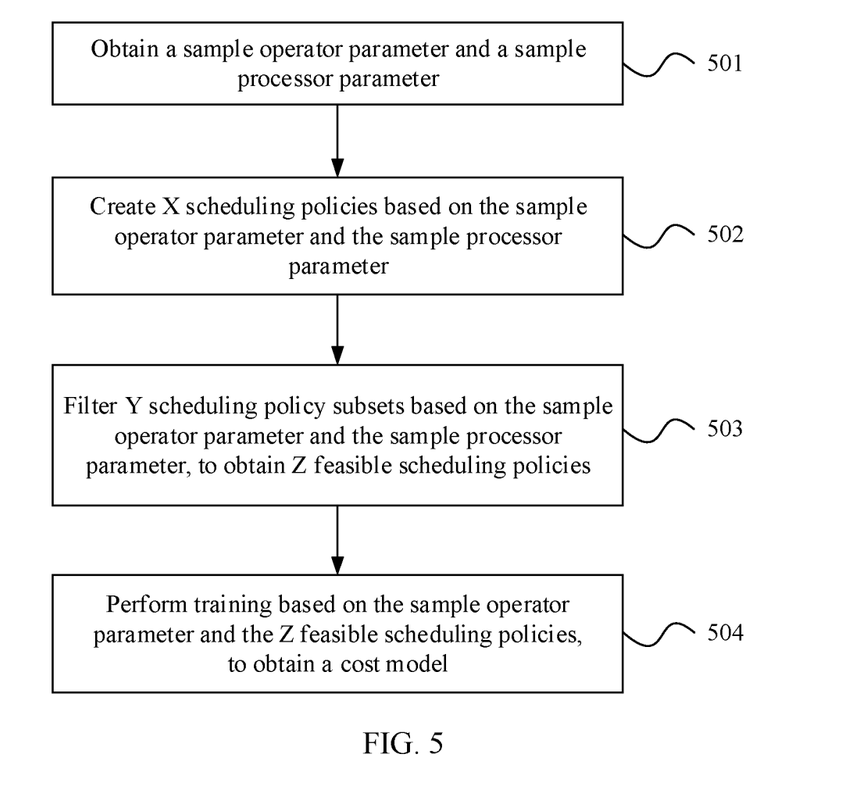
FIG. 5 is a flowchart of Embodiment 2 of an operator operation scheduling method according to this application.

Embodiment 1 is the process of online determining, by the operator operation scheduling system, the optimal scheduling policy based on the operator parameter and the processor parameter that correspond to the operator operation. The cost model used in the process is obtained through training in an offline process. FIG. 5 is a flowchart of Embodiment 2 of an operator operation scheduling method according to this application. As shown in FIG. 5, a cost model training process in this application may include the following steps.

Step 501. Obtain a sample operator parameter and a sample processor parameter.

The sample operator parameter is an available operator parameter, and the sample processor parameter is an available processor parameter. To train a cost model applicable to any operator parameter and any processor parameter, the operator operation scheduling system collects a maximal quantity of available operator parameters and available processor parameters. The operator parameter includes at least one of the following information an operator type, an operator shape size, or the like. The processor parameter includes at least one of the following information a processor architecture, a cache hierarchy, a cache capacity and bandwidth, a computing capability, a processing dominant frequency, or the like. These parameters may be obtained from data input by an input end, or may be obtained based on a model or a type of a processor.

Step 502. Create X scheduling policies based on the sample operator parameter and the sample processor parameter.

The X scheduling policies are classified into Y scheduling policy subsets, each scheduling policy subset includes at least one scheduling policy, and both X and Y are natural numbers. The operator operation scheduling system use factors, for example, the operator type, a data format, and the processor architecture, in the foregoing parameters, that are difficult to be directly modeled, to create the X scheduling policies. Then, the X scheduling policies are classified into the Y scheduling policy subsets, and a general filter condition for the related operator parameter and processor parameter is set for each scheduling policy subset. In this way, isolation between a hardware parameter and a software parameter is implemented. This supports output of a scheduling policy of any operator parameter and any processor parameter, and ensures universality of an operator operation to the processor parameter and the operator type.

Step 503. Filter the Y scheduling policy subsets based on the sample operator parameter and the sample processor parameter, to obtain Z feasible scheduling policies.

The Z feasible scheduling policies are optimal scheduling policies of Z feasible scheduling subsets in the Y scheduling policy subsets, and Z is a natural number less than or equal to Y. The operator operation scheduling system determines a constraint condition based on the sample operator parameter and the sample processor parameter, and filters the Y scheduling policy subsets based on the constraint condition, to obtain the Z feasible scheduling subsets. One or more subsets may be filtered out from the Y scheduling policy subsets based on the constraint condition, or all the Y scheduling policy subsets are reserved. Therefore, Z is a natural number less than or equal to Y. Then, scheduling policies in the Z feasible scheduling subsets are input into a target function to obtain the Z feasible scheduling policies, where the Z feasible scheduling policies are optimal scheduling policies in the Z feasible scheduling subsets. In this application, the operator operation scheduling system first filters the Y scheduling policy subsets based on the constraint condition, to filter out an infeasible scheduling policy subset and/or scheduling policy, so as to reduce a quantity of to-be-searched scheduling policies. Then, the scheduling policies in the Z feasible scheduling subsets are input into the target function for further filtering, so that output scheduling policies are optimal scheduling policies in the feasible scheduling policy subset. Then, a data reuse rate of a scheduling policy is used as an indicator to instruct dimensionality reduction processing performed on the feasible scheduling policy subset. A higher data reuse rate indicates less repeated data migration, better performance, and lower power consumption.

Step 504. Perform training based on the sample operator parameter and the Z feasible scheduling policies, to obtain the cost model.

The operator operation scheduling system inputs the sample operator parameter and the Z feasible scheduling policies into a corresponding processor to obtain Z operator operation costs. The Z operator operation costs are in a one-to-one correspondence with the Z feasible scheduling policies. The operator operation scheduling system further performs training based on the sample operator parameter and the Z feasible scheduling policies by using the Z operator operation costs as a target, to obtain the cost model. In other words, the operator parameter and the Z feasible scheduling policies are run on the actual processor to obtain the operator operation costs of the feasible scheduling policies. Then, training is performed by using the operator operation costs of the Z feasible scheduling policies as a target, to obtain a model that can predict an operation cost of a scheduling policy. In this application, in the cost model training process, training is performed by using the operator operation costs obtained through actually executes by the real processor, to obtain the cost model. In an operator operation scheduling process, the operator operation cost of the feasible scheduling policy is directly output based on the cost model. This saves test time of a feasible scheduling policy of the operator parameter and the processor parameter that correspond to the operator operation, and implements real-time output of an optimal scheduling policy.

In this application, in a case of an offline state, a maximal quantity of factors, in the processor parameter and the operator parameter, that are difficult to be directly modeled are used to create a plurality of scheduling policies, and these scheduling policies are classified into a plurality of scheduling policy subsets. Then, filtering is performed on each scheduling policy subset to obtain an optimal scheduling policy in each scheduling policy subset. This reduces a quantity of to-be-searched scheduling policy subsets. Finally, training is performing by using a running cost of the actual processor as a target, to obtain the cost model. This improves accuracy of cost obtaining, and improves efficiency of online processing.

Figure 6:
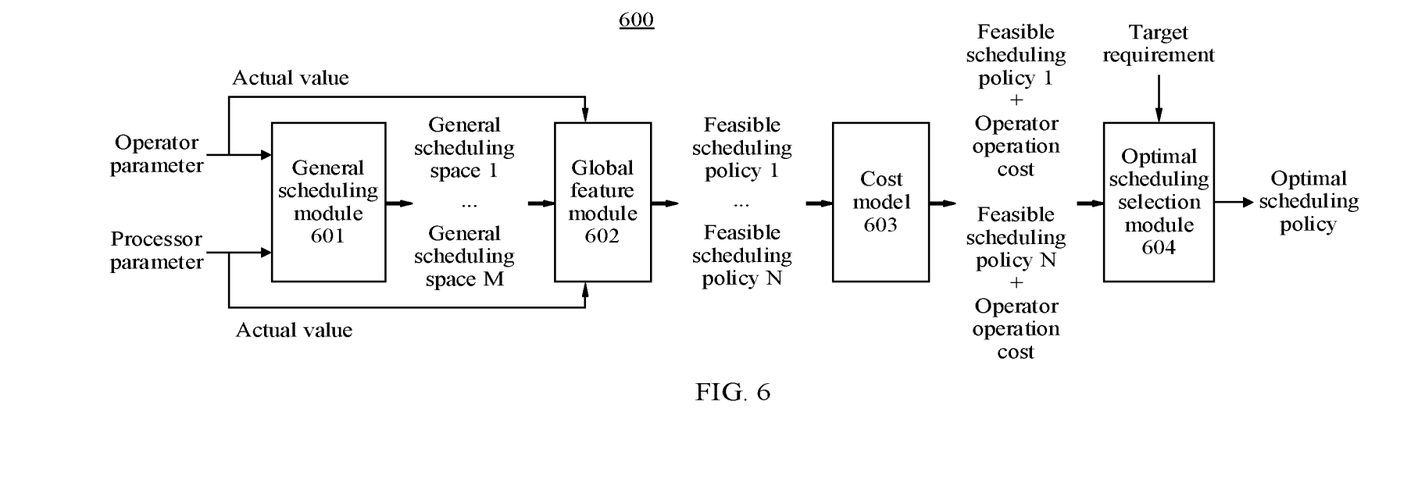
FIG. 6 is a schematic structural diagram of an operator operation scheduling apparatus 600 according to an embodiment of this application.

Based on the schematic diagram shown in FIG. 1, FIG. 6 is a schematic structural diagram of an operator operation scheduling apparatus 600 according to an embodiment of this application. As shown in FIG. 6, the operator operation scheduling apparatus 600 includes a general scheduling module 601, a global feature module 602, a cost model 603, and an optimal scheduling selection module 604. The general scheduling module 601 is configured to obtain an operator parameter and a processor parameter that correspond to an operator operation, and create N scheduling policies based on the operator parameter and the processor parameter. The N scheduling policies are classified into M scheduling policy subsets, each scheduling policy subset includes at least one scheduling policy, and both N and M are natural numbers. The global feature module 602 is configured to filter the M scheduling policy subsets based on the operator parameter and the processor parameter, to obtain K feasible scheduling policies. The K feasible scheduling policies are optimal scheduling policies of K feasible scheduling subsets in the M scheduling policy subsets, and K is a natural number less than or equal to M. The cost model 603 is configured to input the operator parameters and the K feasible scheduling policies into the cost model to obtain K operator operation costs, where the K operator operation costs are in a one-to-one correspondence with the K feasible scheduling policies. The optimal scheduling selection module 604 is configured to determine, based on a target requirement and the K operator operation costs, an optimal scheduling policy used for the operator operation.

In a possible implementation, the global feature module 602 is configured to determine a constraint condition based on the operator parameter and the processor parameter, and filter the M scheduling policy subsets based on the constraint condition, to obtain the K feasible scheduling subsets, and input scheduling policies in the K feasible scheduling subsets into a target function to obtain the K feasible scheduling policies, where the K feasible scheduling policies are optimal scheduling policies in the K feasible scheduling subsets.

In a possible implementation, the optimal scheduling selection module 604 is configured to select, as the optimal scheduling policy based on the K operator operation costs, a feasible scheduling policy that meets the target requirement.

In a possible implementation, the operator parameter includes at least one of the following information an operator type or an operator shape size, the processor parameter includes at least one of the following information a processor architecture, a cache hierarchy, a cache capacity and bandwidth, a computing capability, or a processing dominant frequency, and the scheduling policy includes at least one of the following information a segmentation type, a cyclic sequence, or a data stream.

Figure 7:
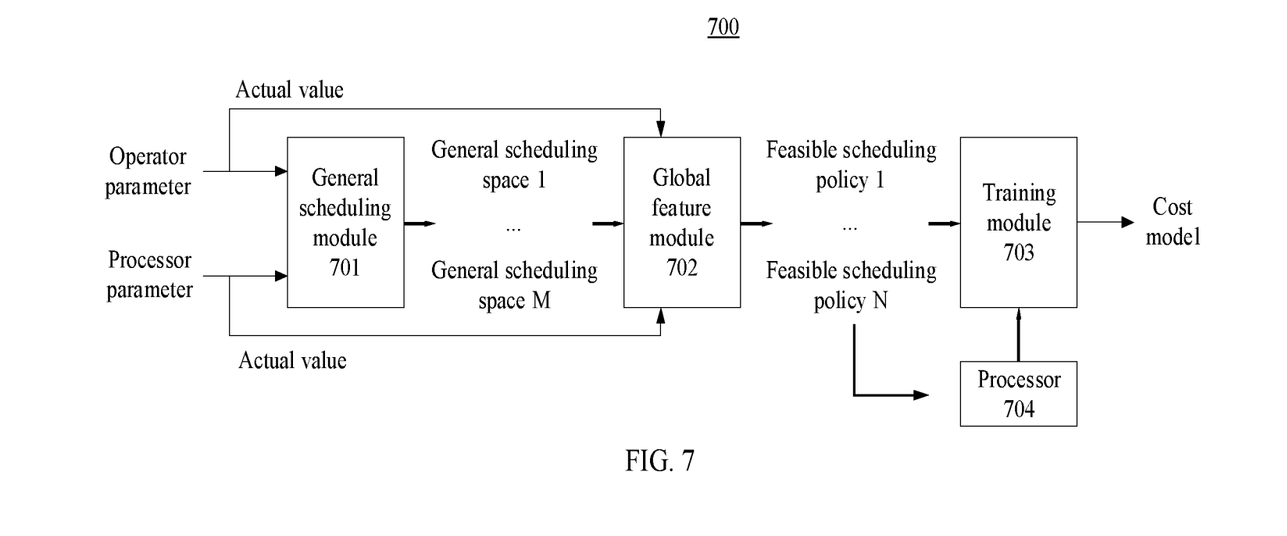
FIG. 7 is a schematic structural diagram of a cost model training apparatus 700 according to an embodiment of this application.

Based on the schematic diagram shown in FIG. 1, FIG. 7 is a schematic structural diagram of a cost model training apparatus 700 according to an embodiment of this application. As shown in FIG. 7, the cost model training apparatus 700 includes a general scheduling module 701, a global feature module 702, and a training module 703. The general scheduling module 701 is configured to obtain a sample operator parameter and a sample processor parameter, where the sample operator parameter is an available operator parameter, and the sample processor parameter is an available processor parameter, create X scheduling policies based on the sample operator parameter and the sample processor parameter, where the X scheduling policies are classified into Y scheduling policy subsets, each scheduling policy subset includes at least one scheduling policy, and both X and Y are natural numbers. The global feature module 702 is configured to filter the Y scheduling policy subsets based on the sample operator parameter and the sample processor parameter, to obtain Z feasible scheduling policies. The Z feasible scheduling policies are optimal scheduling policies of Z feasible scheduling subsets in the Y scheduling policy subsets, and Z is a natural number less than or equal to Y. The training model 703 is configured to perform training based on the sample operator parameter and the Z feasible scheduling policies, to obtain the cost model.

In a possible implementation, the training model 703 is configured to input the sample operator parameter and the Z feasible scheduling policies into a corresponding processor 704 to obtain Z operator operation costs, where the Z operator operation costs are in a one-to-one correspondence with the Z feasible scheduling policies, and perform training based on the sample operator parameter and the Z feasible scheduling policies by using the Z operator operation costs as a target, to obtain the cost model.

It should be noted that the function modules the general scheduling module 601 and the global feature module 602 in FIG. 6 may be same as the general scheduling module 701 and the global feature module 702 in FIG. 7, and the training module 703 in FIG. 7 may be provided for the cost model 603 in FIG. 6 for cost computation.

Figure 8:
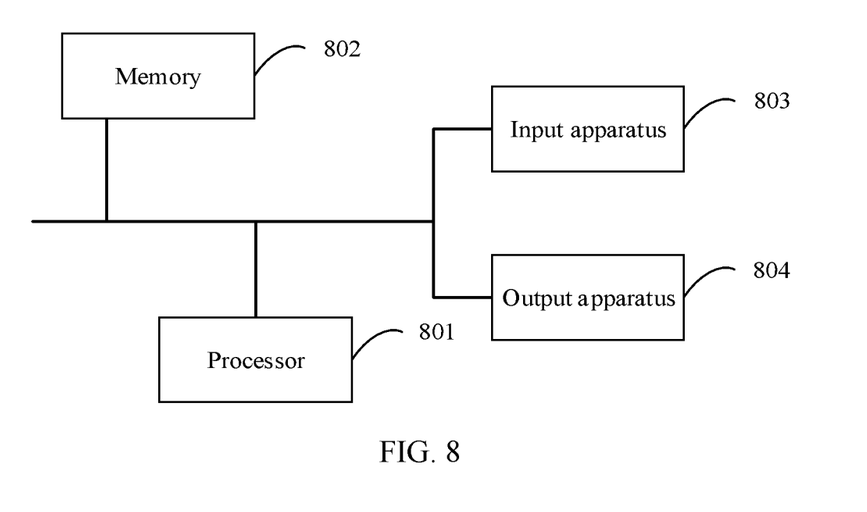
FIG. 8 is a schematic structural diagram of a computer device according to an embodiment of this application.

FIG. 8 is a schematic structural diagram of a computer device according to an embodiment of this application. As shown in FIG. 8, the computer device includes a processor 801, a memory 802, an input apparatus 803, and an output apparatus 804. There may be one or more processors 801 in the computer device, and that there is one processor 801 is used as an example in FIG. 8. The processor 801, the memory 802, the input apparatus 803, and the output apparatus 804 in the computer device may be connected by using a bus or in another manner. For example, the processor 801, the memory 802, the input apparatus 803, and the output apparatus 804 are connected by using a bus in FIG. 8.

As a computer-readable storage medium, the memory 802 may be configured to store a software program, a computer executable program, and a module, for example, a program instruction/module corresponding to the method in the embodiment shown in FIG. 2 or FIG. 5 of this application. The processor 801 runs the software program, the instruction, and the module that are stored in the memory 802, to perform various function applications of the computer device and data processing, that is, to implement the foregoing operator operation scheduling method.

The memory 802 may mainly include a program storage area and a data storage area. The program storage area may store an operating system and an application program required by at least one function. The data storage area may store data created based on use of the terminal, and the like. In addition, the memory 802 may include a high-speed random-access memory (RAM), and may further include a non-volatile memory, for example, at least one magnetic disk storage device, a flash memory device, or another non-volatile solid-state storage device. In some examples, the memory 802 may further include a memory that is remotely disposed for the processor 801, and the remote memory may be connected to the computer device through a network. Examples of the foregoing network include but are not limited to an internet, an intranet, a local area network, a mobile communications network, and a combination thereof.

The input apparatus 803 may be configured to receive input numeral or character information, and generate key signal input related to user setting and function control of the computer device. The output apparatus 804 may include a display device such as a display screen.

In a possible implementation, this application provides a computer-readable storage medium. The computer-readable storage medium stores an instruction, and when the instruction is run on a computer, the instruction is used to perform the method in the embodiment shown in FIG. 2 or FIG. 5.

In a possible implementation, this application provides a computer program. When the computer program is executed by a computer, the computer program is used to perform the method in the embodiment shown in FIG. 2 or FIG. 5.

Persons of ordinary skill in the art may understand that all or some of the steps of the method embodiments may be implemented by a program instructing relevant hardware. The program may be stored in a computer-readable storage medium. When the program is run, the steps of the method embodiments are performed. The foregoing storage medium includes any medium that can store program code, such as a read-only memory (ROM), a RAM, a magnetic disk, or an optical disc.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. An operator operation scheduling method comprising:
obtaining an operator parameter corresponding to an operator operation that comprises an operation to be performed;
obtaining a processor parameter corresponding to the operator operation;
creating N scheduling policies based on the operator parameter and the processor parameter;
classifying the N scheduling policies into M scheduling policy subsets, wherein each of the M scheduling policy subsets comprises a scheduling policy, wherein the scheduling policy comprises at least one of a segmentation type, a cyclic sequence, or a data stream, wherein N and M are natural numbers, and wherein N is greater than, less than, or equal to M;
filtering the M scheduling policy subsets based on the operator parameter and the processor parameter, to obtain K feasible scheduling policies, wherein the K feasible scheduling policies are a first plurality of optimal scheduling policies of K feasible scheduling subsets in the M scheduling policy subsets, and wherein K is a natural number less than or equal to M;
inputting the operator parameter and the K feasible scheduling policies into a cost model to obtain K operator operation costs, wherein the K operator operation costs are in a one-to-one correspondence with the K feasible scheduling policies; and
obtaining, based on a target requirement and the K operator operation costs, an optimal scheduling policy used for the operator operation,
wherein the target requirement meets a customer's criterion.

2. The operator operation scheduling method of claim 1, further comprising:
determining a constraint condition based on the operator parameter and the processor parameter; and
filtering the M scheduling policy subsets to obtain the K feasible scheduling subsets based on the constraint condition.

3. The operator operation scheduling method of claim 1, further comprising determining, based on the K operator operation costs, a feasible scheduling policy that meets the target requirement as the optimal scheduling policy.

4. The operator operation scheduling method of claim 1, wherein the operator parameter comprises at least one of an operator type or an operator shape size, and wherein the processor parameter comprises at least one of a processor architecture, a cache hierarchy, a cache capacity and bandwidth, a computing capability, or a processing dominant frequency.

5. The operator operation scheduling method of claim 1, wherein the operator parameter comprises at least one of an operator type or an operator shape size, and wherein the processor parameter comprises at least one of a processor architecture, a cache hierarchy, a cache capacity and bandwidth, a computing capability, or a processing dominant frequency.

6. The operator operation scheduling method of claim 1, wherein the operator parameter comprises at least one of an operator type or an operator shape size, and wherein the processor parameter comprises at least one of a processor architecture, a cache hierarchy, a cache capacity and bandwidth, a computing capability, or a processing dominant frequency.

7. The operator operation scheduling method of claim 1, wherein before obtaining the operator parameter and obtaining the processor parameter, the operator operation scheduling method further comprises:
obtaining a sample operator parameter that is an available operator parameter;
obtaining a sample processor parameter that is an available processor parameter;
creating X scheduling policies based on the sample operator parameter and the sample processor parameter, wherein the X scheduling policies are classified into Y scheduling policy subsets, wherein each of the Y scheduling policy subsets comprises a scheduling policy, and wherein both X and Y are natural numbers;
filtering the Y scheduling policy subsets to obtain Z feasible scheduling policies based on the sample operator parameter and the sample processor parameter, wherein the Z feasible scheduling policies are a second plurality of optimal scheduling policies of Z feasible scheduling subsets in the Y scheduling policy subsets, and wherein Z is a natural number less than or equal to Y; and
training to determine the cost model based on the sample operator parameter and the Z feasible scheduling policies.

8. The operator operation scheduling method of claim 7, further comprising:
inputting the sample operator parameter and the Z feasible scheduling policies into a processor to obtain Z operator operation costs, wherein the Z operator operation costs are in a one-to-one correspondence with the Z feasible scheduling policies; and
training to determine the cost model based on the sample operator parameter and the Z feasible scheduling policies using the Z operator operation costs as a target.

9. A computer device comprising:
a processor; and
a memory coupled to the processor and configured to store instructions that, when executed by the processor, cause the computer device to be configured to:
obtain an operator parameter corresponding to an operator operation that comprises an operation to be performed;
obtain a processor parameter corresponding to the operator operation;
create N scheduling policies based on the operator parameter and the processor parameter;
classify the N scheduling policies into M scheduling policy subsets, wherein each of the M scheduling policy subsets comprises a scheduling policy, wherein the scheduling policy comprises at least one of a segmentation type, a cyclic sequence, or a data stream, wherein N and M are natural numbers, and wherein N is greater than, less than, or equal to M;
filter the M scheduling policy subsets based on the operator parameter and the processor parameter, to obtain K feasible scheduling policies, wherein the K feasible scheduling policies are a first plurality of optimal scheduling policies of K feasible scheduling subsets in the M scheduling policy subsets, and wherein K is a natural number less than or equal to M;
input the operator parameter and the K feasible scheduling policies into a cost model to obtain K operator operation costs, wherein the K operator operation costs are in a one-to-one correspondence with the K feasible scheduling policies; and obtain, based on a target requirement and the K operator operation costs, an optimal scheduling policy used for the operator operation,
wherein the target requirement meets a customer's criterion.

10. The computer device of claim 9, wherein the instructions further cause the computer device to be configured to:
determine a constraint condition based on the operator parameter and the processor parameter; and
filter the M scheduling policy subsets to obtain the K feasible scheduling subsets based on the constraint condition.

11. The computer device of claim 9, wherein the instructions further cause the computer device to be configured to determine a feasible scheduling policy that meets the target requirement as the optimal scheduling policy based on the K operator operation costs.

12. The computer device of claim 9, wherein the operator parameter comprises at least one of an operator type or an operator shape size, and wherein the processor parameter comprises at least one of a processor architecture, a cache hierarchy, a cache capacity and bandwidth, a computing capability, or a processing dominant frequency.

13. The computer device of claim 9, wherein before the instructions cause the computer device to obtain the operator parameter and obtain the processor parameter, the instructions further cause the computer device to be configured to:
obtain a sample operator parameter that is an available operator parameter;
obtain a sample processor parameter that is an available processor parameter;
create X scheduling policies based on the sample operator parameter and the sample processor parameter, wherein the X scheduling policies are classified into Y scheduling policy subsets, wherein each of the Y scheduling policy subsets comprises a scheduling policy, and wherein both X and Y are natural numbers;
filter the Y scheduling policy subsets to obtain Z feasible scheduling policies based on the sample operator parameter and the sample processor parameter, wherein the Z feasible scheduling policies are a second plurality of optimal scheduling policies of Z feasible scheduling subsets in the Y scheduling policy subsets, and wherein Z is a natural number less than or equal to Y; and
train to determine the cost model based on the sample operator parameter and the Z feasible scheduling policies.

14. The computer device of claim 13, wherein the instructions further cause the computer device to be configured to:
input the sample operator parameter and the Z feasible scheduling policies into another processor to obtain Z operator operation costs, wherein the Z operator operation costs are in a one-to-one correspondence with the Z feasible scheduling policies; and
train to determine the cost model based on the sample operator parameter and the Z feasible scheduling policies using the Z operator operation costs as a target.

15. A computer program product comprising computer-executable instructions stored on a non-transitory computer-readable medium that, when executed by a processor, cause a computer device to:
obtain an operator parameter corresponding to an operator operation that comprises an operation to be performed;
obtain a processor parameter corresponding to the operator operation;
create N scheduling policies based on the operator parameter and the processor parameter;
classify the N scheduling policies into M scheduling policy subsets, wherein each of the M scheduling policy subsets comprises a scheduling policy, wherein the scheduling policy comprises at least one of a segmentation type, a cyclic sequence, or a data stream, wherein N and M are natural numbers, and wherein N is greater than, less than, or equal to M;
filter the M scheduling policy subsets based on the operator parameter and the processor parameter, to obtain K feasible scheduling policies, wherein the K feasible scheduling policies are a first plurality of optimal scheduling policies of K feasible scheduling subsets in the M scheduling policy subsets, and wherein K is a natural number less than or equal to M;
input the operator parameter and the K feasible scheduling policies into a cost model to obtain K operator operation costs, wherein the K operator operation costs are in a one-to-one correspondence with the K feasible scheduling policies; and
obtain, based on a target requirement and the K operator operation costs, an optimal scheduling policy for the operator operation,
wherein the target requirement meets a customer's criterion.

16. The computer program product of claim 15, wherein the instructions further cause the computer device to:
determine a constraint condition based on the operator parameter and the processor parameter; and
filter the M scheduling policy subsets to obtain the K feasible scheduling subsets based on the constraint condition.

17. The computer program product of claim 15, wherein the instructions further cause the computer device to determine, based on the K operator operation costs, a feasible scheduling policy that meets the target requirement as the optimal scheduling policy.

18. The computer program product of claim 15, wherein the operator parameter comprises at least one of an operator type or an operator shape size, and wherein the processor parameter comprises at least one of a processor architecture, a cache hierarchy, a cache capacity and bandwidth, a computing capability, or a processing dominant frequency.

19. The computer program product of claim 15, wherein before the instructions cause the computer device to obtain the operator parameter and obtain the processor parameter, the instructions further cause the computer device to:
obtain a sample operator parameter that is an available operator parameter;
obtain a sample processor parameter that is an available processor parameter;
create X scheduling policies based on the sample operator parameter and the sample processor parameter, wherein the X scheduling policies are classified into Y scheduling policy subsets, wherein each of the Y scheduling policy subsets comprises a scheduling policy, and wherein X and Y are natural numbers;
filter the Y scheduling policy subsets to obtain Z feasible scheduling policies based on the sample operator parameter and the sample processor parameter, wherein the Z feasible scheduling policies are a second plurality of optimal scheduling policies of Z feasible scheduling subsets in the Y scheduling policy subsets, and wherein Z is a natural number less than or equal to Y; and
train to determine the cost model based on the sample operator parameter and the Z feasible scheduling policies.

20. The computer program product of claim 19, wherein the instructions further cause the computer device to:
- input the sample operator parameter and the Z feasible scheduling policies into another processor to obtain Z operator operation costs, wherein the Z operator operation costs are in a one-to-one correspondence with the Z feasible scheduling policies; and
- train to determine the cost model based on the sample operator parameter and the Z feasible scheduling policies using the Z operator operation costs as a target.

* * * * *